Dec. 29, 1931.     S. E. HITT     1,838,484
CONTROL OF AIR VALVES FOR AEROFOILS
Filed June 10, 1929     6 Sheets-Sheet 1

WITNESSES
Earle E. Weller
Ethel E. Weller

INVENTOR
Samuel E. Hitt

Dec. 29, 1931.  S. E. HITT  1,838,484
CONTROL OF AIR VALVES FOR AEROFOILS
Filed June 10, 1929   6 Sheets-Sheet 2
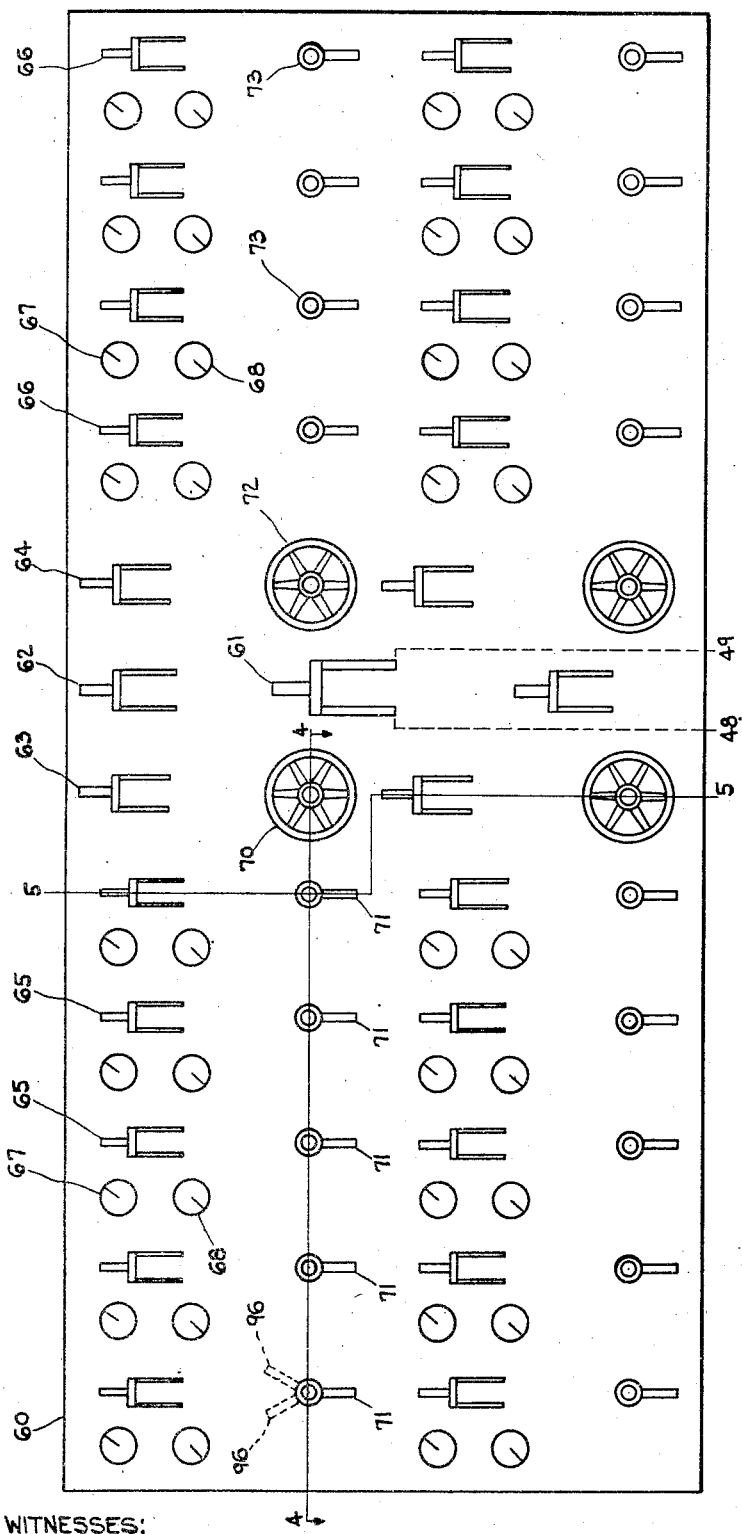
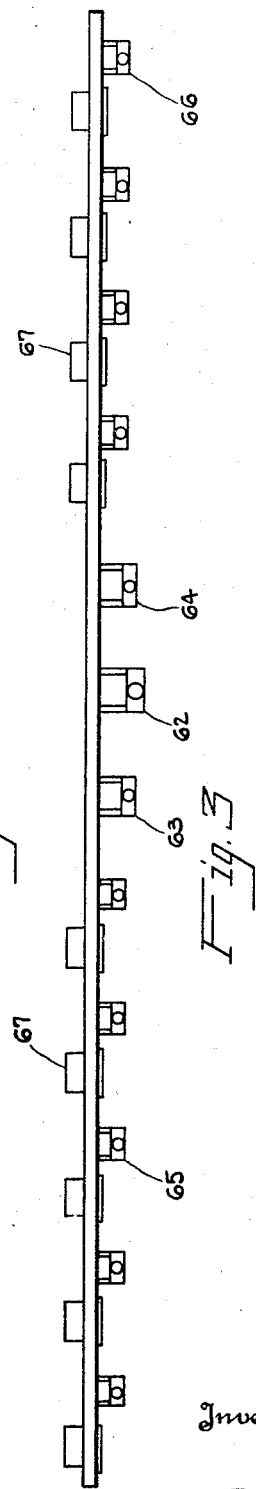
Inventor
Samuel E. Hitt
WITNESSES:
Earle E. Weller
Ethel C. Weller

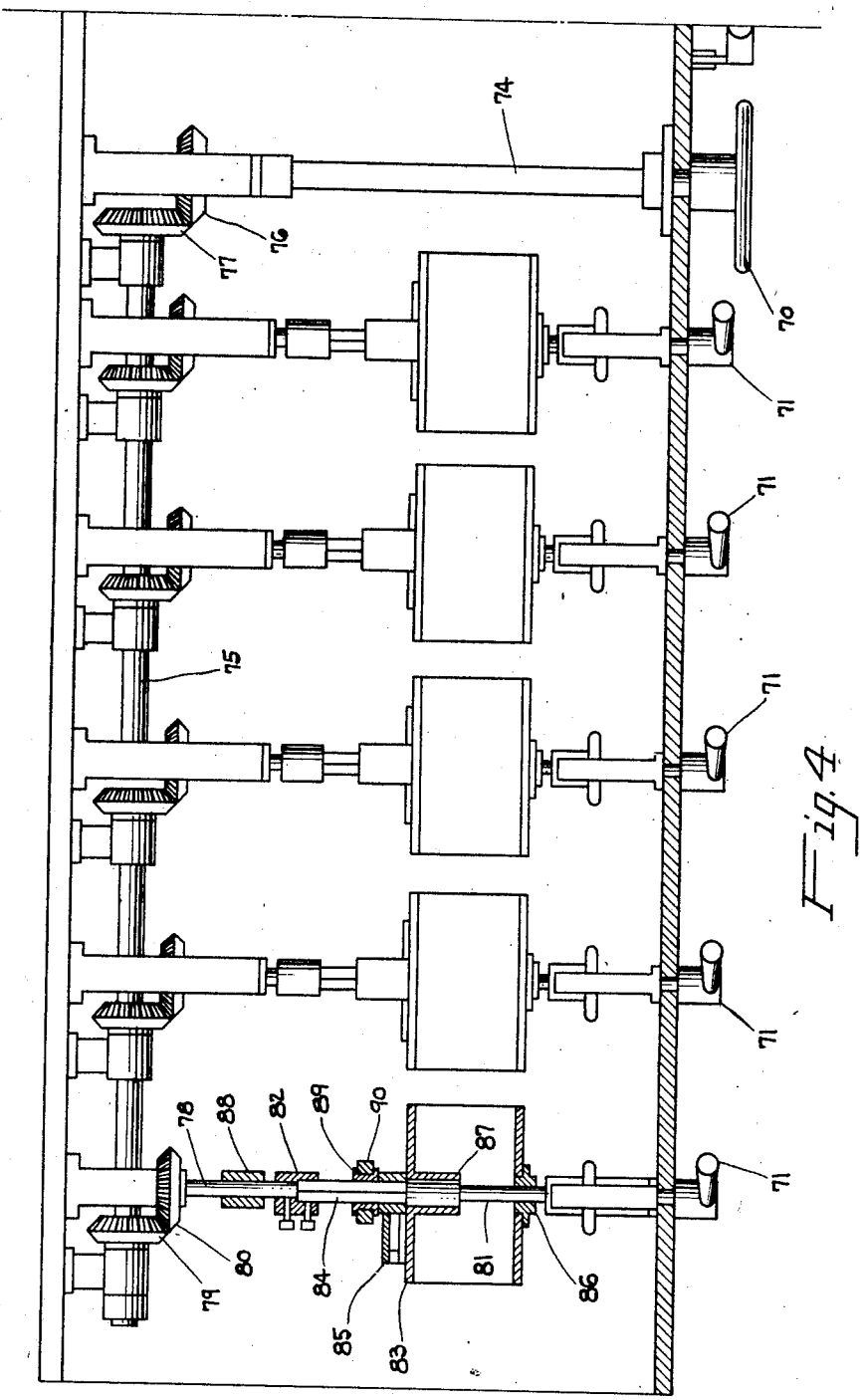

Dec. 29, 1931.  S. E. HITT  1,838,484
CONTROL OF AIR VALVES FOR AEROFOILS
Filed June 10, 1929  6 Sheets-Sheet 4

Inventor
Samuel E. Hitt

WITNESSES:
Earle E. Weller
Ethel E. Weller

Dec. 29, 1931.  S. E. HITT  1,838,484
CONTROL OF AIR VALVES FOR AEROFOILS
Filed June 10, 1929  6 Sheets-Sheet 5
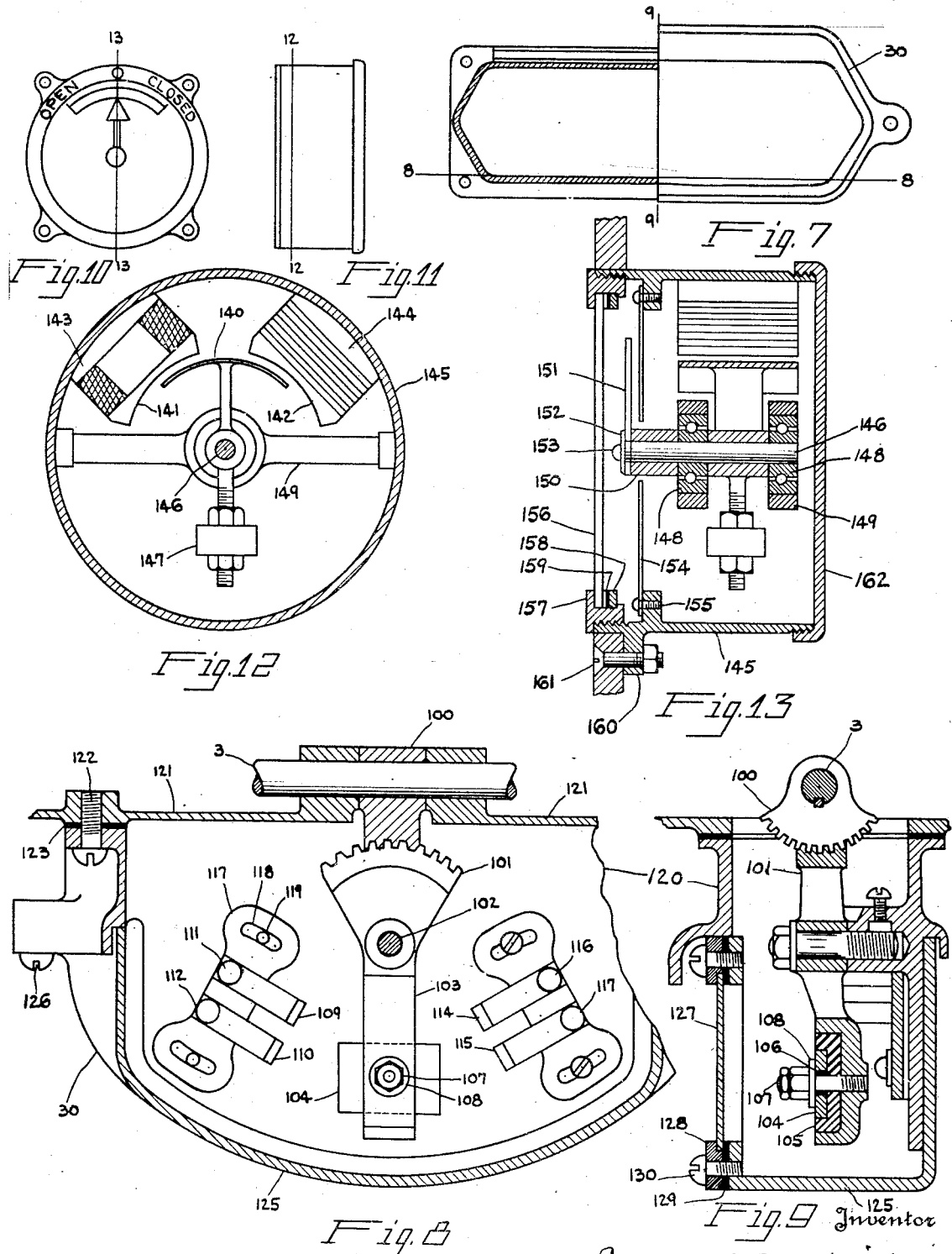

Dec. 29, 1931.  S. E. HITT  1,838,484
CONTROL OF AIR VALVES FOR AEROFOILS
Filed June 10, 1929  6 Sheets-Sheet 6

WITNESSES:
Earle E. Weller.
Ethel C. Weller

Inventor
Samuel E. Hitt

Patented Dec. 29, 1931

1,838,484

UNITED STATES PATENT OFFICE

SAMUEL E. HITT, OF ELYRIA, OHIO

CONTROL OF AIR VALVES FOR AEROFOILS

Application filed June 10, 1929. Serial No. 369,902.

This invention relates to control of wing area of seaplanes and aeroships, such as described in my application air and water craft, Serial No. 264,634, filed March 26th, 1928, and in more detail in my application air valves for aerofoils, Serial No. 341,538, filed February 20th, 1929, and in my application aerofoils for aeroships, Serial No. 339,231, filed February 11, 1929.

In case a storm is raging at sea and the navigator deems it unwise to try and fly through and desires to come to and ride out the storm it would be extremely hazardous to ride upon the surface after losing headway with all wings spread.

It becomes necessary to reduce the wing area while still at comparatively high speed by opening the wing air valves so that the wind will blow through the wings without exerting enough pressure upon the wings to cause any damage or to lift the aeroship from the water.

My aeroship is planned to carry eighteen masts with one or more wings on each mast so it is evident that hand control would require manning of each mast and would also have the disadvantage that the masts could not be manned or the air valves operated until the aeroship had slowed down to a comparatively low speed.

I, therefore, provide electric motors for the operation of the wing air valves and it is the primary object of this invention to provide means of control of all of the wing air valves from a central point such as the pilot house.

Inasmuch as my aeroship is about a thousand feet long, the pilot cannot always see whether all of the air valves are open or closed. It is, therefore, a further object of my invention to provide means by which the operator will know whether each and every wing is in flying condition or not.

A further object of my invention is to provide a switchboard with all necessary apparatus for the attainment of the above ends.

Another object of my invention is to provide the switchboard with switches and controllers for operating the wing air valve motors.

Another object of my invention is to provide an ammeter for each wing air valve motor.

Another object of my invention is to provide wing air valve motor control as a unit for each hull and separately for the fore and aft motors of each hull and separately for each individual wing motor.

Another object of my invention is to provide a contact device on each wing for open and closed positions of the air valves.

Another object of my invention is to provide an indicating instrument on the switchboard for each wing, by which the pilot can see whether the air valves are open or closed.

Another object of my invention is to provide collector rings for the electric circuits leading to the wing air valve motors and the contactors of each wing when the wings are pivoted.

With the above and other objects in view, the invention further includes the following novel features and details of construction, to be hereinafter more fully described, illustrated in the accompanying drawings and pointed out in the appended claims.

Referring to the drawings:—

Fig. 2 is a front view of the switchboard.

Fig. 3 is a plan of the panel.

Fig. 4 is a sectional plan on line 4—4 of Fig. 2.

Fig. 7 is a part sectional plan of contactor.

Fig. 8 is a section on line 8—8 of Fig. 7.

Fig. 9 is a section on line 9—9 of Fig. 7.

Fig. 10 is a front view of the air valve indicator.

Fig. 11 is a side view of the air valve indicator.

Fig. 12 is a section on line 12—12 of Fig. 11.

Fig. 13 is a section on line 13—13 of Fig. 10.

Figure 1:
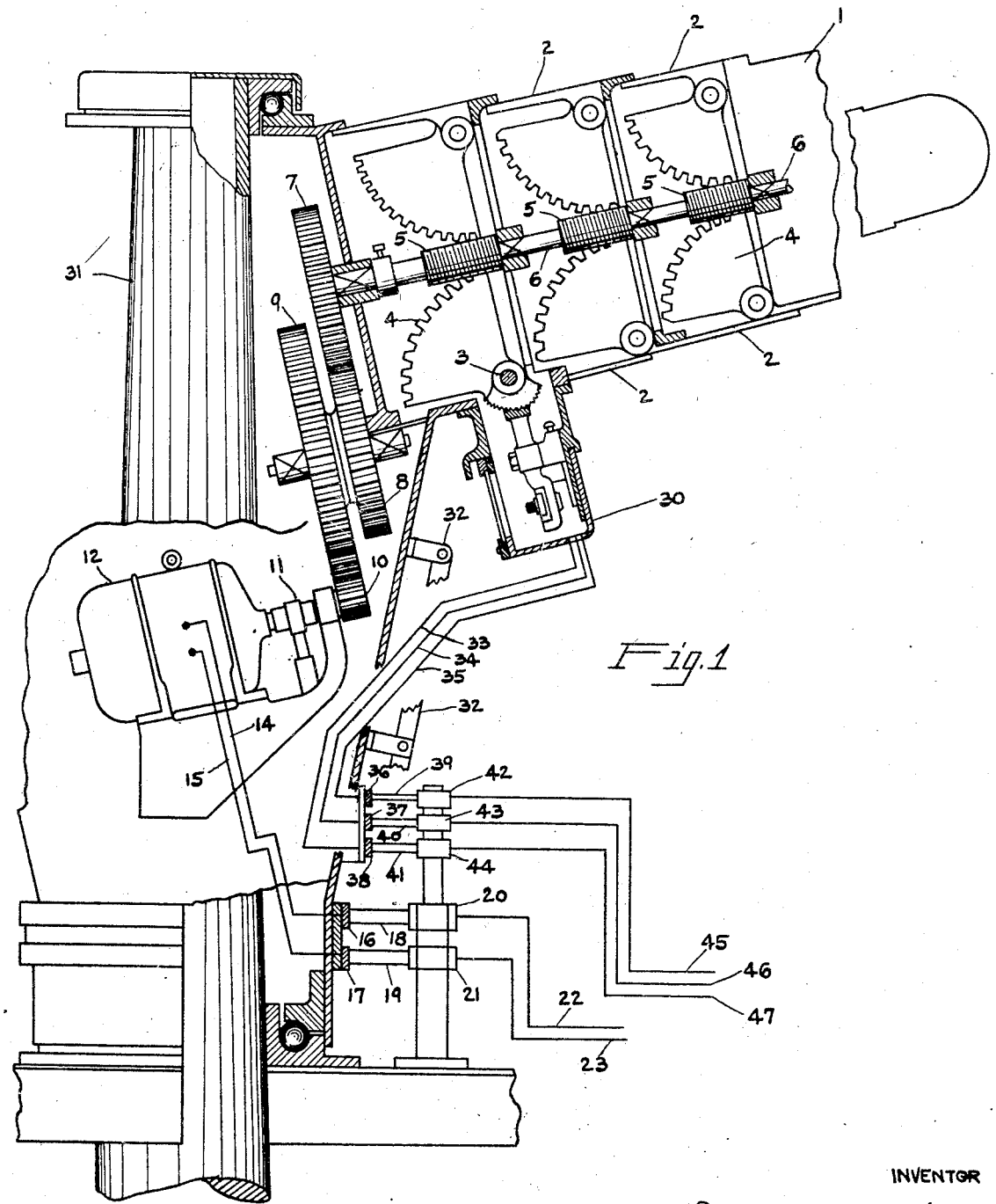
Fig. 1 is a vertical section through a wing, with an intermediate portion of the wing broken away; and with the mast and a portion of the upper mast-bearing cap as well as the valve-controlling motor shown in elevation.
Figure 6:
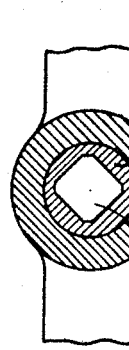
Fig. 6 is a detail of the controller shaft mounting.

Referring to the drawings in detail wherein like characters of reference denote corresponding parts, in Fig. 1, 1 is the wing carrying air valves 2 mounted on shafts 3 and operated by worm wheels 4, worms 5, shafting 6, gears 7, 8, 9 and 10, slip gear 11 and electric motor 12.

Electric motor 12 derives current supply from leads 14 and 15 connected to the insulated collector rings 16 and 17 and through the brushes 18 and 19 and brush holders 20 and 21 to the current leads 22 and 23 going to the switchboard in the pilot house.

The contactor 30 is mounted under quadrant gear shaft 3, directly under the wing 1 and near the mast 31 to be accessible to the ladder 32.

From the contactor 30, leads 33, 34, and 35 connect to the collector rings 36, 37 and 38, brushes 39, 40 and 41, brush holders 42, 43 and 44 and leads 45, 46 and 47 going to the indicating instrument on the switchboard.

The contactor 30 is connected to the shaft 3 by helical gears 100 and 101, as shown in Fig. 8.

In Fig. 2, on the wing switchboard 60, the main switch 61 supplies current from mains 48—49 leading to the power house.

The upper half of switchboard is for the port hull. The lower half is for the starboard hull.

For the sake of simplicity, the switchboard is shown for 18 wings only, one for each mast of the aeroship.

62 is a main switch for the port hull, 63 a switch for all wings forward and 64 a switch for all wings aft. 65 are switches for each wing forward and 66 switches for each wing aft. 67 are indicators for each wing to show whether the air valves are open or closed. 68 are ammeters for current reading when the motors are running.

The hand wheel 70 operates the electric controllers 71 for the air valve motors 12 forward on the port hull and the hand wheel 72 all the motor controllers 73 aft on hull 1.

In Fig. 4, the hand wheel 70 is shown mounted on shaft 74 which drives the shaft 75 through miter gears 76 and 77. The shaft 75 operates all of the controller shafts 78 for the wing motors forward through the miter gears 79 and 80. The controller shaft proper 81 is secured to the shaft 78 by the coupling 82 so that the controller can be replaced in a few moments in case of a burn out. The shaft 81 is provided with a square shank 84 for driving the controller arm 85. The controller shaft 81 is mounted in bearings 86, 87 and 88 and the square shank in the sleeve 89 running in the bearing 90. With this mounting the operator can pull the shaft 81 out by the handle 71, disengaging the gear 80 from the gear 79, removing this element from hand wheel control, without disturbing the controller arm 85.

When the shaft 81 is thus pulled out, the controller arm 85 derives rotary movement from the handle 71 and is free to so move until the gears are again put in mesh.

Ordinarily all the controllers 83 with their handles 71 are operated as a group by the hand wheel 70, but in case one of the indicators fails to record either "open" or "closed" position of the air valves, as the case may be, then the operator pulls the handle 71 no matter where it stands and operates the motor for that wing separately until the open or closed position is attained.

Figure 5:
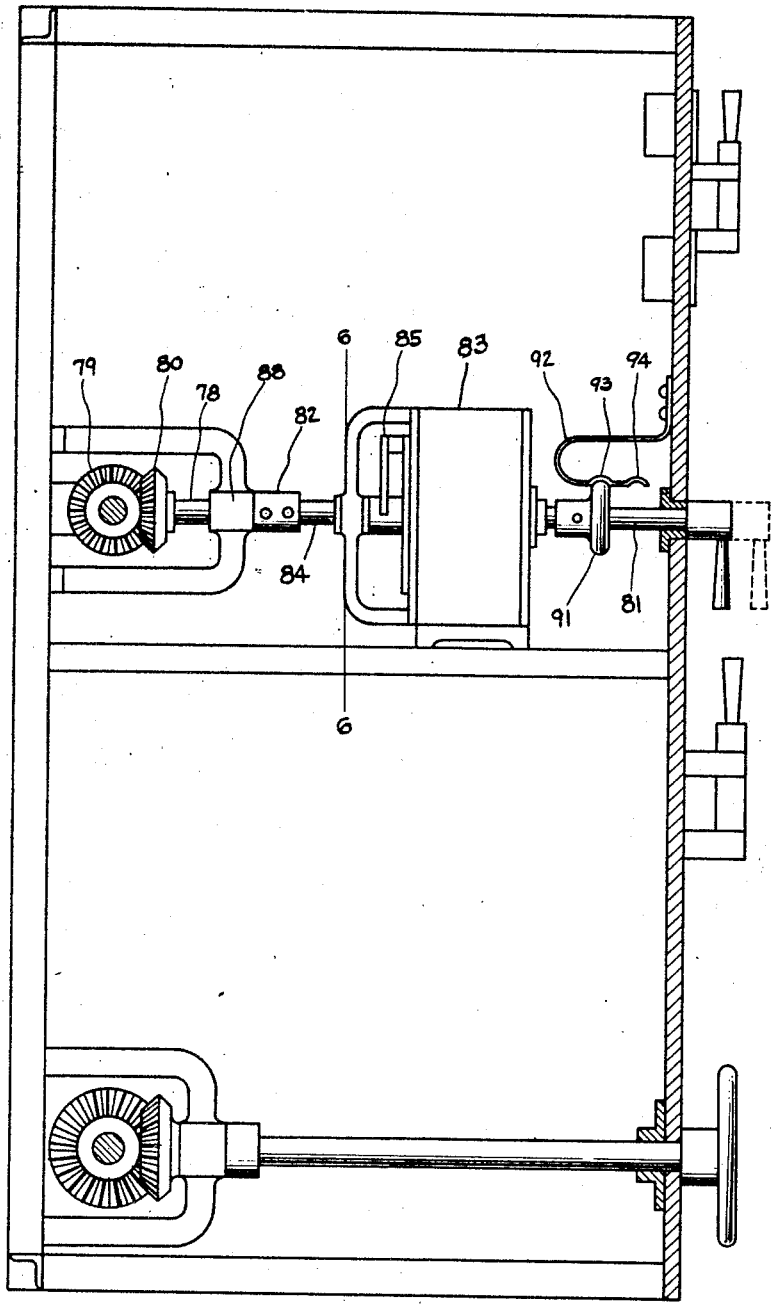
Fig. 5 is a sectional elevation on line 5—5 of Fig. 2.

As shown in Fig. 5, the controller shaft 81 carries a knob or circular disc 91 which engages a spring 92 notched at 93 to hold the gears in mesh and at 94 to hold it when pulled out without preventing rotary movement or offering but negligible resistance to end movement of the shaft 81.

The controllers 83 are reversing and as shown in Fig. 2, the handles 71 are shown down in the off position.

When it is desired to close the air valves the hand wheel 70 is turned clockwise until the valves are closed and then turned back until the handles 71 point down again showing the motors are off.

When it is desired to open the air valves the hand wheel is turned counterclockwise reversing the motor and when the indicators show the air valves to be open, the hand wheel is turned back bringing all controllers to the off position again.

The motors are only used to open and close the air valves. The air valves are locked in position by the worm gearing.

The construction of the contactor 30 is shown in Figs. 7, 8 and 9 in which 3 is the air valve shaft which carries the helical gear 100 which engages the helical gear 101 of the contactor 30. These gears are placed at right angles to position the contactor edgewise to the resultant air current to reduce wind resistance. The gears 100 and 101 have a ratio of 2 to 3 so that when the air valves move through 90°, the contactor shaft 102 and arm 103 move through 60°. The arm 103 carries the knife blade 104 insulated therefrom by a pad 105 and bushing 106 and held in place by screw 107 and insulating washer 108.

Switch blades 109 and 110 are set to engage the knife blade 104 when the arm 103 has swung 30 degrees clockwise. Switch blades 114 and 115 are set to engage the knife blade 104 when the arm 103 has swung 30 degrees counterclockwise. Binding posts 111 and 112 are for the switch blades 109 and 110 and binding posts 116 and 117 are for the switch blades 114 and 115. These switch blades with their binding posts are mounted on bases 117 with arced slots 118 and fastening screws 119 to be adjustable for knife contact and switch travel.

These working parts are carried by the casing 120 secured to the wing framing 121 by screws 122 with gasket 123. The lower part of the casing 125 is removable, secured with screws 126 and carries a glass front 127 held in place by frame 128, gasket 129 and screws 130.

In Fig. 10, the pointer swings to the left and points to the word "Open" when the air valves are open and swings to the right and points to the word "Closed", when the air valves are seated and the aerofoil is in flying condition. For any other position the arrow points to "O".

In Fig. 12, the armature 140 swings under the poles 141 and 142 of the electro-magnets 143 and 144 which are mounted within the casing 145.

The armature 140 is mounted on a spindle 146 and overbalanced by the adjustable counterweight 147 to hold it in vertical position when the coils are not magnetized. The spindle 146 revolves in ball bearings 148 carried by the frame 149 secured to the casing 145. The spindle 146 carries the hub 150 on which is mounted the pointer 151 with washer 152 and screw 153.

The scale card plate 154 is secured to the casing 145 by screws 155. The glass 156 is carried by the cover 157 and held in place by the snap ring 158 and gasket 159. The casing is mounted on the switchboard with lugs 160 and screws 161 so that the front 157 and back 162 can be removed and the instrument repaired without removal from the switchboard.

Figure 14:
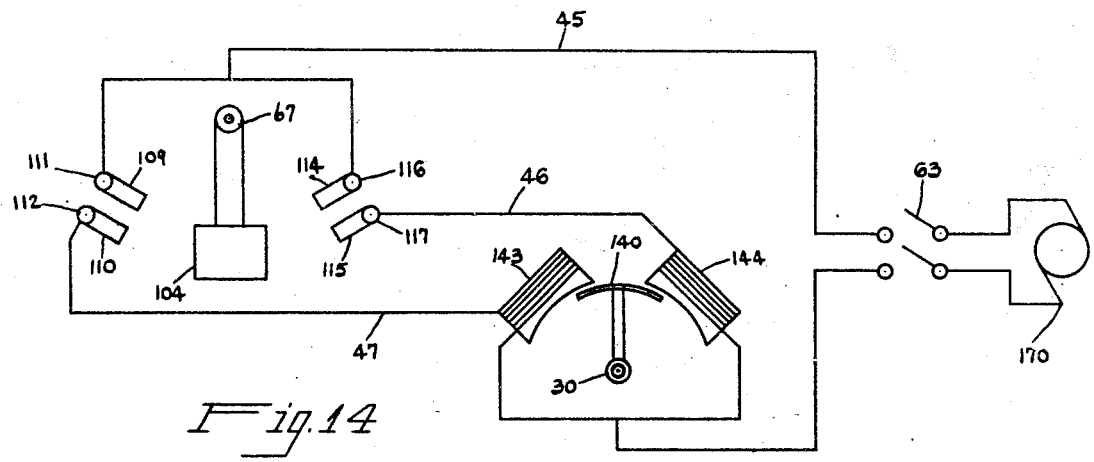
Fig. 14 is an electrical diagram of contactor and air valve indicator.

The indicator circuit is shown in Fig. 14 in which 30 is the contactor and 67 the indicator, 170 generator, 63 switch, 45 lead from contactor to generator or main, 46 and 47 leads from contactor to indicator.

When the air valves become full open, the knife blade 104 makes contact with switch blades 109 and 110, completing a circuit through the magnet 143. The armature 140 is pulled to the left and the pointer shows "Open" position of air valves. When the air valves become seated, the knife blade 104 makes contact with switch blades 114 and 115, completing a circuit through the magnet 144, the armature 140 swings to the right and the pointer shows "Closed" position of the air valves.

Figure 15:
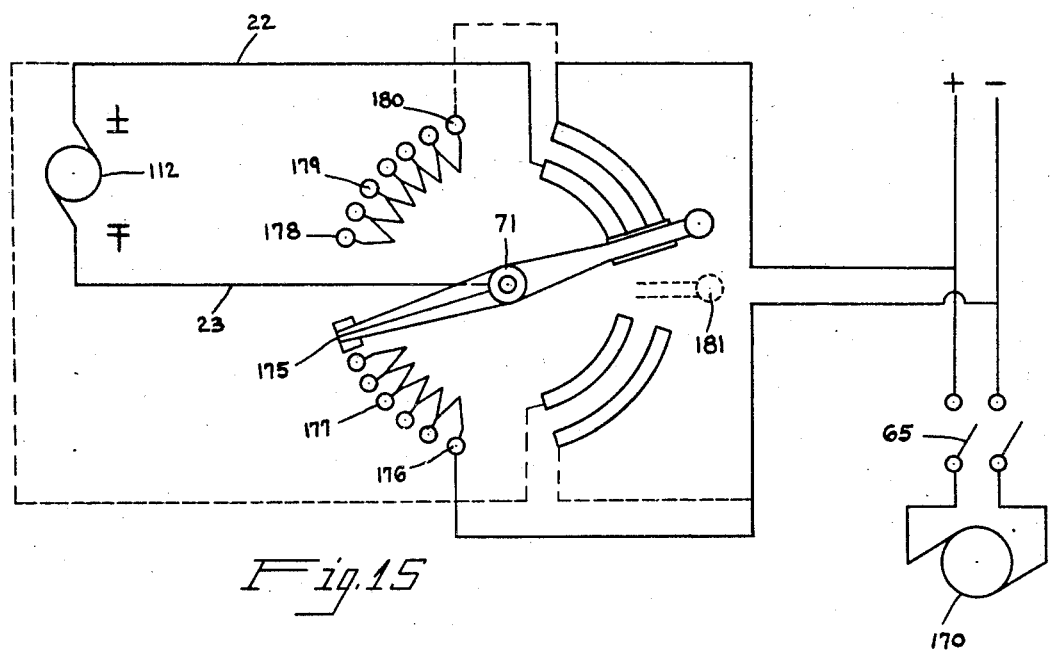
Fig. 15 is an electrical diagram of wing air valve motor control.

The motor circuit is shown in Fig. 15 in which 71 is a motor controller, 112 is the air valve motor, 22 and 23 are leads to the motor, 170 is the generator. 65 is the main switch.

The controller is shown with air valves closed, the motor starting to open the valves, arm standing at 175. When the controller arm moves to 176 the resistance 177 is out and the motor gets full pressure. The ammeter must be watched when operating the controller. When the controller is moved back to neutral position 181, the motor stops.

To reverse the motor and close the air valves, the controller arm is moved to 178, throwing in resistance 179, the motor starts reversed and when 180 is reached, the motor gets full pressure. When the indicator shows the air valves to be closed, the controller is moved back to neutral position 181 and the motor stops.

The operation of my invention is as follows:—

In case a storm becomes very severe and the navigator fears the strain on the aeroship is becoming too great, and wishes to reduce the amount of wing area spread, he signals the switchboard operator to open the wing air valves. The order can be to open all of the air valves on all of the wings of both hulls, or for either hull, or for the forward or aft wings of either or both hulls.

In case the order is given to open the forward air valves on hull 1, the operator turns the handwheel 70 counterclockwise which turns all the controllers 71 to position 95, starting the wing motors 112 that open those valves. When turning the handwheel 70, the operator watches the ammeters 68 to see if the motors are taking current and not too much, and also the indicators 67 to see when they indicate that those air valves have become full open. When those air valves are shown to be open, the operator turns the handwheel 70 clockwise until all the controller handles 71 point down again, when those motors 112, all stop and their air valves are left full open and all of the pointers 151 of the indicators 67 point to the word "Open".

During this operation, if one of the indicators 67 stands at "O", showing the air valves of that wing are neither full open or closed, then the handle 71 of the controller for that motor is pulled out and that controller operated separately until that indicator shows open, when the handle is turned to down position again, and pushed back into group control.

In case the order is given to open all the wing air valves on hull 1, the operator turns both handwheels 70 and 72 at the same time.

In case the navigator desires to open all the wing air valves, the order is first given to open the air valves aft on both hulls first so that the aeroship will not have a tendency to nose down and submerge the hull bows.

When the wind reaches a high velocity, and especially if of a cyclonic nature, and the air valves are open very little damage can result because the wind is not able to get enough hold on the wings to lift the aeroship from the water.

When the storm is over, the navigator gives the order to close the air valves and the operator turns the handwheels 70 and 72 clockwise causing the handles 71 to move to the left to position 96, thus reversing the motors and closing the wing air valves.

When the indicators show "Closed" the handwheels are turned counterclockwise bringing the handles 71 down to off position and the motors stop, leaving the valves seated and locked by the worm gearing.

The current for motors 112 can also be cut off more quickly by pulling the switch 63 and the controllers returned to their off position later.

It is apparent that the embodiment of the invention which I have described in detail possesses all the features of advantage enumerated as desirable in the statement of the invention and the above description. It is also evident that numerous changes in the details of construction and in the combination and arrangement of parts may be resorted to without departing from the spirit and scope of the invention as hereinafter claimed without sacrificing any of its advantages.

The term "hull unit" designates one hull with its reenforcing framework. The term "superstructure" refers to all the framework above the hulls.

What I claim is:—

1. In an aeroship or similar craft, the combination of a hull unit, of aeroplanes carried by the said hull unit, each aeroplane being equipped with air valves to reduce the wing area spread, the said air valves of each aeroplane operated by an electric motor under centralized control, by which the wing area of the aeroplanes can be controlled separately or in groups, and a contactor device operated by the air valves of each aeroplane in circuit with an indicating instrument under centralized control, to show whether the air valves are open and the aeroplane or aeroplanes inoperative, or closed and the aeroplane or aeroplanes in flying condition.

2. In an aeroship or the like, a wing provided with air valves for decreasing its effective surface, the air valves decreasing in size laterally outward of the wing; an electric motor, and gearing interposed between the motor and all of the valves for simultaneously actuating the valves.

3. In an aeroship or the like, a wing having upper and lower surfaces, air valves in each of the said surfaces for modifying the effective total area of the surface, the air valves in the two surfaces being respectively superposed, an electric motor, and gear mechanism directly connecting the motor with all of the said valves for conjointly operating the valves.

4. In an aeroship or similar craft, a hull unit, a plurality of aeroplanes carried by the hull unit, air valves associated with each aeroplane for varying the effective wing area of the aeroplane, electric motors respectively connected to the air valves associated with each aeroplane, a motor controller associated with each motor, and means for operating the motor controllers separately or in groups, substantially as specified.

Signed at Elyria, Ohio, June 7th, 1929.

SAMUEL E. HITT.